US005863626A

United States Patent [19]

Yamasaki

[11] Patent Number: 5,863,626

[45] Date of Patent: Jan. 26, 1999

[54] ELECTRIC CONDUCTIVE ROLLER

[75] Inventor: Yuji Yamasaki, Kakogawa, Japan

[73] Assignee: Sumitomo Rubber Industries Ltd., Hyogo, Japan

[21] Appl. No.: 876,251

[22] Filed: Jun. 16, 1997

Related U.S. Application Data

[63] Continuation of Ser. No. 489,618, Jun. 12, 1995, abandoned.

[30] Foreign Application Priority Data

Jun. 13, 1994 [JP] Japan .................................... 6-130542
Feb. 22, 1995 [JP] Japan .................................... 7-034030

[51] Int. Cl.$^{6}$ .............................. B32B 1/08; B32B 15/04; F16C 13/00; B65H 29/00

[52] U.S. Cl. ......................... 428/36.5; 428/220; 428/457; 428/462; 492/53; 492/56; 492/59; 355/200

[58] Field of Search ................................. 428/35.8, 36.5, 428/36.8, 36.9, 323, 462, 220; 492/56, 59, 53; 355/200

[56] References Cited

U.S. PATENT DOCUMENTS 4,317,265 3/1982 Chase et al. .............................. 29/132
4,379,630 4/1983 Suzuki ................................. 355/3 TR
4,908,665 3/1990 Takeda et al. .......................... 355/245
4,998,143 3/1991 Kumasaka et al. ..................... 355/271
5,051,332 9/1991 Hosoya .
5,110,705 5/1992 Hosoya et al. .......................... 430/120
5,241,343 8/1993 Nishio ..................................... 355/219
5,309,206 5/1994 Deishi et al. ........................... 355/246
5,434,653 7/1995 Takizawa et al. ...................... 355/259
5,443,873 8/1995 Itani et al. ............................. 428/36.5
5,454,559 10/1995 Murakami et al. ..................... 271/272
5,489,974 2/1996 Kamaji et al. .......................... 355/245

FOREIGN PATENT DOCUMENTS

A-0 542 522 5/1992 European Pat. Off. .

OTHER PUBLICATIONS

American Cyanamid, *The Chemistry of Acrylomitrile,* 1959, pp. 51–53, (no month).

H.F. Mark et al., Encyclopedia of Polymer Science and Technology, vol. 6, p. 308, 1986 (no month).

*Primary Examiner*—John J. Zimmerman
*Assistant Examiner*—Michael LaVilla
*Attorney, Agent, or Firm*—Nikaido Marmelstein Murray & Oram, LLP.

[57] ABSTRACT

Disclosed is an electric conductive roller comprising a rubber having a volume specific resistance of not more than $10^{12}$ Ωcm and an electric conductive filler mixed in the rubber, said electric conductive roller satisfying the following formulas (1) and (2):

$$\log R \geqq \log R_0 - 4 \quad (1)$$

$$\log R < \log R_0 \quad (2)$$

wherein R is a resistance of the roller when the electric conductive filler is added, and $R_0$ is a resistance of the roller when no electric conductive filler is added.

This electric conductive roller has a low dependence of an electric resistance on a change in applied voltage and environment.

5 Claims, 1 Drawing Sheet

ELECTRIC CONDUCTIVE ROLLER

This application is a continuation of application Ser. No. 08/489,618 filed Jun. 12, 1995, now abandoned.

BACKGROUND OF THE INVENTION

This invention relates to an electric conductive roller which is used for electrophotographic apparatuses such as copying machine, printer, facsimile and the like.

In various electrophotographic apparatuses, there have hitherto been used an electric conductive roller which is charged or discharged by applying a voltage to a roller shaft to bring the surface of the roller into contact with a charged material.

That is, in Japanese Laid-Open Patent Publication No. 5-331307, there is disclosed an electric conductive roller obtained by mixing carbon black as an electric conductive substance with an ethylene-propylene-diene copolymer rubber (EPDM) and subjecting the resulting blend to foam molding.

Further, in Japanese Patent Publication No. 5-40772, there is disclosed an electric conductive polyurethane foam obtained by mixing a quaternary ammonium salt with a polyurethane foam and subjecting the blend to foam casting.

It is necessary for the above electric conductive roller, wherein carbon black is mixed in the ethylene-propylene-diene copolymer rubber, to mix a large amount of carbon black so as to obtain a desired electric resistance value. Therefore, the electric resistance of the roller varies as a function of a change in applied voltage. Resistance which has such a dependence on the applied voltage requires a precision applied voltage control apparatus so as to obtain a requisite transfer current when the electric conductive roller is used for the electrophotographic apparatus, thereby causing a problem of an increase in cost.

On the other hand, in the electric conductive roller obtained by mixing the quaternary ammonium salt with polyurethane and foaming the blend, the electric resistance depends upon the amount of the quaternary ammonium salt to be mixed. Since the polyurethane itself has semiconducting properties, its resistance does not significantly vary depending on the applied voltage. However, when a hydrophilic quaternary ammonium salt is additionally mixed in a hydrophilic polymer, the changes in electric resistance due to a change in environment (e.g. temperature, humidity, etc.) is large.

Further, it has also been known to set the electric resistance at a desired value by only using a low-resistance rubber without mixing carbon black, quaternary ammonium salt, etc. there with. The electric conductive roller thus obtained has a problem in that it's change in resistance due to environmental change is large, but the change in electric resistance is not as large as that in case of the combination of the polyurethane with quaternary ammonium salt.

Therefore, it has hitherto been desired to develop an electric conductive roller which is stable to a change in applied voltage and environment.

SUMMARY OF THE INVENTION

It is a main object of this invention to solve the above problems, thereby providing an electric conductive roller whose resistance is stable to changes in applied voltage and environment.

The electric conductive roller of this invention solves the above problems. It comprises a rubber having a volume specific resistance of not more than $10^{12}$ Ωcm and an electric conductive filler blended in the rubber, said electric conductive roller satisfying the following formulas (1) and (2):

$$\log R \leqq \log R_0 - 4 \quad (1)$$

$$\log R < \log R_0 \quad (2)$$

wherein R is a resistance of the roller after the electric conductive filler has been added, and $R_0$ is a resistance of the roller when no electric conductive filler is added.

That is, since the rubber having a volume specific resistance of $10^9$ to $10^{12}$ Ωcm itself has an electric conductivity, a roller having a resistance of $10^6$ to $10^9$ Ω can be made without mixing an electric conductive filler, thereby improving the stability to the change in applied voltage. However, there is a problem that the stability of the resistance to the change in environment is inferior. Therefore, the present inventors have succeeded in improving the stability of the resistance to the change in environment by adding an electric conductive filler so as to satisfy the above formulas (1) and (2), in this invention.

In this case, when the amount of the electric conductive filler is too large to satisfy the condition of the formula (1), the dependence of the resistance on changes in applied voltage becomes high. On the other hand, when the condition of the formula (2) is not satisfied, the dependence of the resistance on environmental changes becomes high.

DETAILED DESCRIPTION OF THE INVENTION

Figure 2:
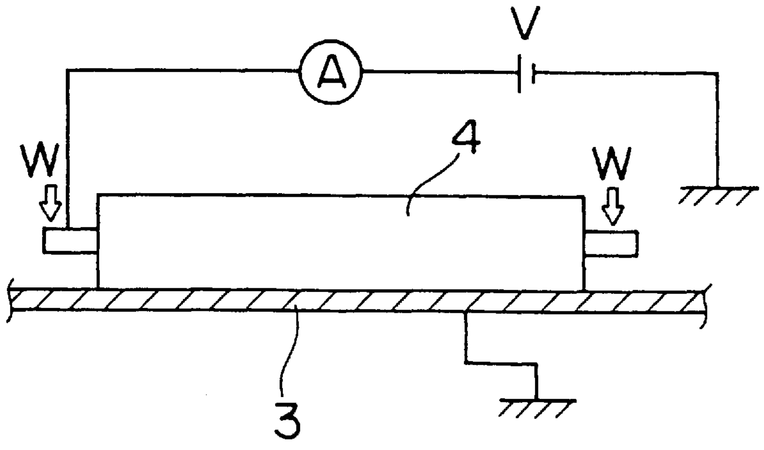
FIG. 2 is an explanatory view illustrating a method for measuring a resistance value of the roller of this invention.

The resistance of the roller represented by the above R or $R_0$ is determined as follows. That is, as shown in FIG. 2, a roller 4 is placed on an aluminum plate 3, and a load W of 500 g is applied on both ends of the roller 4, respectively. Then, a predetermined voltage V is applied to the roller and the resistance is calculated according to the following Ohm's law:

$$R \text{ (or } R_0) = V/A$$

wherein A is a measured current value, and V is an applied voltage.

The electric conductive roller of this invention is produced in the form of a sponge tube, and an electric conductive shaft is inserted into the sponge tube. The adjustment of the electric resistance of the electric conductive roller can also be controlled by adjusting a foaming percentage.

The rubber material which can be used in this invention may be any rubber having a volume specific resistance of not more than $10^{12}$ Ωcm (including those obtained by mixing two or more sorts of rubbers), and examples thereof include:

(1) acrylonitrile-butadiene copolymer rubber, (2) hydrogenated nitrile rubber, (3) acrylonitrile-butadiene copolymer rubber and ethylene-propylene-diene copolymer rubber, (4) hydrogenated nitrile rubber and ethylene-propylene-diene copolymer rubber, (5) hydrogenated nitrile rubber and acrylonitrile-butadiene copolymer rubber, and (6) hydrogenated nitrile rubber, acrylonitrile-butadiene copolymer rubber and ethylene-propylene-diene copolymer rubber.

When the acrylonitrile-butadiene copolymer rubber (hereinafter referred to as "NBR") is used as a base rubber of the sponge tube, the content of acrylonitrile in NBR is 15 to 55%, preferably 25 to 45%.

Further, examples of the hydrogenated nitrile rubber (hereinafter referred to as "HNBR") include those sold commercially under those trademarks: Zetpol 1020, Zetpol 2010, Zetpol 2020, etc., manufactured by Nihon Zeon Co., Ltd.

When NBR is used in combination with the ethylene-propylene-diene copolymer rubber (hereinafter referred to as "EPDM"), examples of dienes in EPDM include ethylidene norbornene, 1,4-hexadiene, dicyclopentadiene and the like. Further, there can be used the same one as that described above, as NBR. The mixing ratio (by weight) of NBR:EPDM is 100:0 to 60:40.

When HNBR is used in combination with EPDM, there can be used the same mixing ratio as that described above, with respect to HNBR and EPDM. It is preferred that the mixing ratio of HNBR:EPDM (by weight) is 100:0 to 50:50.

When HNBR is used in combination with NBR, there can be used the same mixing ratio as that described above, with respect to HNBR and NBR. It is preferred that the mixing ratio of HNBR:NBR (by weight) is 100:0 to 20:80.

When HNBR, NBR and EPDM are used in combination, there can be used the same mixing ratio as that described above, with respect to HNBR, NBR and EPDM. It is preferred that the mixing ratio of HNBR:NBR:EPDM (by weight) is 100:0:0 to 10:70:20.

The volume specific resistance of the rubber material is determined according to "resistivity" defined in JIS K 6911. Specifically, circular surface and back surface electrodes are provided on both ends of a disc sample having a diameter of about 100 mm and a thickness of 2 mm, respectively. Then, a voltage of 10 V is applied and a volume resistance Rv (Ω) is measured after 60 seconds has passed from the beginning of application. Incidentally, the measurement is conducted under condition of temperature of 23.5° C. and a humidity of 55% RH, and a time of seasoning to make the sample adapt to the measuring condition is 90 hours. Thus, the volume specific resistance $\rho_v$ will be determined according to the following formula:

$$\rho_v = R_{V(\pi d}{}^2/4t)$$

wherein d is an outer diameter (cm) of the surface electrode, and t is a thickness (cm) of the sample.

Examples of additives which are necessary to produce the sponge tube in this invention include vulcanizing agents, foaming agents, vulcanization accelerators, antioxidants, softeners, plasticizers, reinforcers, fillers and the like. Among them, additives other than vulcanizing agents and foaming agents may be optionally added.

As the vulcanizing agent, there can be used sulfur, organic sulfur compounds, organic peroxides and the like. Examples of the organic sulfur compounds include tetramethylthiuram disulfide, N,N'-dithiobismorpholine and the like. Further, examples of the organic peroxides include benzoyl peroxide and the like. It is suitable that the amount of the vulcanizing agent to be added is 0.3 to 4 parts by weight, preferably 0.5 to 3 parts by weight, based on 100 parts by weight of the rubber component.

Examples of the foaming agents include diaminobenzene, dinitrosopentamethylenetetramine, benzenesulfonylhydrazide, azodicarbonamide and the like. It is suitable that the amount of the foaming agent to be added is 2 to 30 parts by weight, preferably 3 to 20 parts by weight, based on 100 parts by weight of the rubber component.

Examples of the vulcanization accelerators include inorganic accelerators such as slaked lime, magnesia MgO, litharge PbO, etc., organic accelerators such as thiurams (e.g. tetramethylthiuram disulfide, tetraethylthiuram disulfide, etc.), dithiocarbamates (e.g. zinc dibutyldithiocarbamate, zinc diethyldithiocarbamate, etc.), thiazoles (e.g. 2-mercaptobenzothiazole, N-cyclohexyl-2-benzothiazole sulfonamide, etc.), thioureas (e.g. trimethylthiourea, N,N'-diethylthiourea, etc.) and the like.

Examples of the vulcanization accelerator auxiliaries include metal oxides (e.g. zinc white, etc.), fatty acids (e.g. stearic acid, oleic acid, cottonseed fatty acid, etc.), other vulcanizing accelerator auxiliaries which have hitherto been known and the like. Further, examples of the antioxidants include imidazoles (e.g. 2-mercaptobenzoimidazole, etc.), amines (e.g. phenyl-α-naphthylamine, N,N-di-β-naphthyl-p-phenylenediamine, N-phenyl-N'-isopropyl-p-phenylenediamine, etc.), phenols (e.g. di-tert-butyl-p-cresol, styrenated phenol, etc.) and the like.

Examples of the softeners include fatty acids (e.g. stearic acid, lauric acid, etc.), cottonseed oil, tall oil, asphalt substance, paraffin wax and the like. Examples of the plasticizer include dibutyl phthalate, dioctyl phthalate, tricresyl phosphate and the like.

Typical examples of the reinforcers include carbon black, which exerts a large influence on the electric conductivity of the electric conductive roller of this invention, as an electric conductive filler. Examples of the fillers include calcium carbonate, clay, barium sulfate, diatomaceous earth and the like.

Examples of the electric conductive fillers in this invention include carbon black, graphite, metal oxide and the like. Examples of the carbon black include channel black, furnace black, acetylene black and the like. Examples of the metal oxide include tin oxide, titanium oxide (including those of which surface is coated with tin oxide) and the like.

The amount of the electric conductive filler to be added may be the amount which satisfies the above formulas (1) and (2). For example, it is suitable that the amount is 5 to 60 parts by weight, preferably 30 to 50 parts by weight, based on 100 parts by weight of the rubber material, when carbon black is used as the electric conductive filler. When the amount of the electric conductive filler exceeds this range, the electric resistance of the roller greatly depends on the applied voltage, and it is not preferred. Further, it is suitable that the particle size of carbon black is 18 to 120 m$\mu$, preferably 22 to 90 m$\mu$.

As the electric conductive shaft in this invention, there can be used any one which has hitherto been used as the shaft of the electric conductive roller, and examples thereof include shafts of metals (e.g. copper, aluminum, etc.).

A process for producing the electric conductive roller of this invention will be explained hereinafter. Firstly, electric conductive fillers and requisite various additives are added to a rubber material having the above volume specific resistance and, after kneading, the blend is subjected to extrusion molding to form a tube, which is vulcanized and then subjected to secondary vulcanization. It is preferred that the vulcanization is conducted using a vulcanizer, but other vulcanizing methods may be used. The vulcanizing condition varies depending upon the kind and amount of the rubber to be used, but the vulcanization may be normally conducted at 140° to 170° C. for 0.5 to 6 hours. Further, the secondary vulcanization may be conducted in a hot-air oven at about 140° to 200° C. for 0.5 to 4 hours. The foaming is conducted in the process of the vulcanization, thereby obtaining an electric conductive roller as a sponge tube. It is suitable that the foaming percentage (volume % increase upon foaming) is within a range of 140 to 400, preferably 200 to 350.

Figure 1:
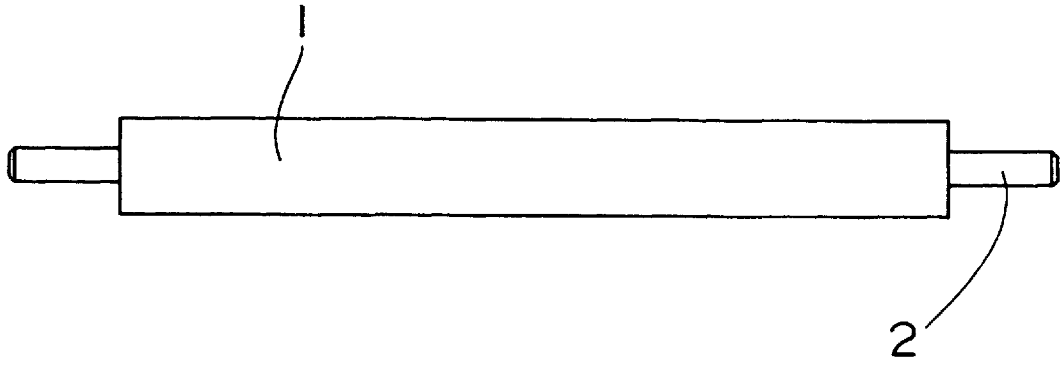
FIG. 1 is a plane view illustrating one embodiment of the electric conductive roller of this invention.

As shown in FIG. 1, an electric conductive shaft 2 is inserted into the resulting electric conductive roller 1, which is then cut off to a predetermined length and the surface is polished. The electric conductive roller 1 is charged or discharged by applying a voltage to an electric conductive shaft 2 to bring the surface of the roller 1 into contact with a charged material.

In the electric conductive roller of this invention, an electric resistance from the electric conductive shaft to the outer surface of the roller is preferably within a range of $10^3$ to $10^{10}$ Ω. When the electric resistance is less than this range, problems which the image (e.g. leak, contamination of paper, etc.) may arise. On the other hand, if the electric resistance exceeds the above range, the transfer efficiency is inferior and such a roller cannot be used practically. Further, it is preferred that the electric conductive roller of this invention has a surface hardness of 20 to 45 [measured by a rubber hardness tester Asker C (Model DD2, type C, manufactured by Kobunshi Keiki Co., Ltd)], a specific gravity of 0.25 to 0.55, a water absorption of 10 to 60% and a cell diameter on its outer surface, of not more than 800 μm. All of these property values show a range which is suitable to obtain an optimum image when the electric conductive roller of this invention is used as a transfer roller of an electrophotographic apparatus.

That is, when the hardness is less than the above range, fatigue of the roller is liable to arise and the durability is insufficient. On the other hand, when the hardness exceeds the above range, partial omission phenomenon is liable to arise in letters of the image. Further, when the cell diameter of the outer surface of the transfer roller exceeds the above range, pinholes are liable to arise in the image roller. Further, when the water absorption is less than the above range, fatigue of the roller is liable to arise. On the other hand, when the water absorption exceeds the above range, the hardness of the roller increases and, therefore, partial omission phenomenon mentioned above is liable to arise in letters in the image. Incidentally, the condition to obtain the optimum image varies depending upon the kind and operating condition of the electrophotographic apparatus to be used so that it is not necessarily limited to these ranges.

As described above, the electric conductive roller of this invention has an effect that the dependence of the electric resistance on the change in applied voltage and environment is low.

EXAMPLES

The following Examples and Comparative Examples further illustrate the electric conductive roller of this invention in detail, but this invention is not limited thereto.

Examples 1 to 3 and Comparative Examples 1 to 2 (Base rubber: chloroprene rubber)

As a rubber material, a chloroprene rubber having a volume specific resistance of $10^{11.9}$ Ωcm, a glass transition point of −50° C., a Sp (solubility parameter) value of 9.2, a dielectric constant of 6 and a dielectric dissipation factor (tan δ) of $5\times10^{-2}$ was used, and it was mixed with electric conductive fillers and other additives in the amount shown in Table 1.

That is, the respective components in Table 1 were masticated using a Banbury mixer, kneaded and subjected to extrusion molding. Then, the resulting molded roller article was put in a vulcanizer and vulcanized at 140° C. for 2 hours and, further, it was subjected to secondary vulcanization in a hot-air oven at 150° C. for 4 hours to give an electric conductive roller. A metal shaft was inserted into this electric conductive roller, and the electric conductive roller was cut off to a length of 216 mm and then polished to give a polished roller of 17 mm in outer diameter.

TABLE 1

| | Comparative Example 1 | Example 1 | Example 2 | Example 3 | Comparative Example 2 |
|---|---|---|---|---|---|
| Neoprene WRT | 100 | 100 | 100 | 100 | 100 |
| Diablack LH | — | 30 | 35 | 40 | 45 |
| Asahi #35G | — | 10 | 10 | 10 | 10 |
| Stearic acid | 1 | 1 | 1 | 1 | 1 |
| Kyomag #150 | 5 | 5 | 5 | 5 | 5 |
| ZnO #1 | 10 | 10 | 10 | 10 | 10 |
| TMU-MS | 1.5 | 1.5 | 1.5 | 1.5 | 1.5 |
| Nocceler TT | 0.3 | 0.3 | 0.3 | 0.3 | 0.3 |
| Nocceler DM | 0.5 | 0.5 | 0.5 | 0.5 | 0.5 |
| Vinyfor AC#3 | 4 | 4 | 4 | 4 | 4 |
| Cellpaste 101 | 4 | 4 | 4 | 4 | 4 |
| Neocellborn N#5000 | 12 | 12 | 12 | 12 | 12 |

The materials used are as follows.

Neoprene WRT: chloroprene rubber manufactured by Syowa Denko Co., Ltd.-Du Pont Co., Ltd.

Diablack LH: carbon black (electric conductive filler) manufactured by Mitsubishi Kasei Co., Ltd.

Asahi #35G: carbon black (electric conductive filler) manufactured by Asahi Carbon Co., Ltd.

Stearic acid: manufactured by Nihon Yushi Co., Ltd.

Kyomag #150: magnesium oxide manufactured by Kyowa Kagaku Kogyo Co., Ltd.

TMU-MS: trimethylthiourea (vulcanization accelerator) manufactured by Ohuchi Shinko Kagaku Kogyo Co., Ltd.

Nocceler TT: tetramethylthiuram disulfide (vulcanization accelerator) manufactured by Ohuchi Shinko Kagaku Kogyo Co., Ltd.

Nocceler DM: dibenzothiazyl disulfide (vulcanization accelerator) manufactured by Ohuchi Shinko Kagaku Kogyo Co., Ltd.

Vinyfor AC#3: azodicarbonamide (foaming agent) manufactured by Eiwa Kasei Co., Ltd.

Cellpaste 101: urea compound (foaming auxiliary) manufactured by Eiwa Kasei Co., Ltd.

Neocellborn N#5000: benzenesulfonylhydrazide (foaming agent) manufactured by Eiwa Kasei Co., Ltd.

The electric characteristics and hardness of the resulting electric conductive roller are shown in Table 2. In Table 2, each electric resistance indicates an electric resistance (log Ω) from the metal shaft to the surface, respectively, and the hardness was determined by Asker C. R and $R_0$ are as defined above.

In Table 2, the formula ($\log R_1 - \log R_2$) indicates a dependence on the environment and the formula ($\log R_3 - \log R_4$) indicates a dependence on the applied voltage.

That is, when each formula has the following relation:

$$(\log R_1 - \log R_2) \leqq 1.0 \quad (3)$$

$$(\log R_3 - \log R_4) \leqq 1.0 \quad (4)$$

wherein $R_1$ is a resistance when the applied voltage is 1000 V under the condition of a temperature of 10° C. and a humidity of 15%, $R_2$ is a resistance when the applied voltage is 1000 V under the condition of a temperature of 32.5° C. and a humidity of 90%, $R_3$ is a resistance when the applied voltage is 10 V under the condition of a temperature of 23.5° C. and a humidity of 55%, and $R_4$ is a resistance when the applied voltage is 1000 V under the condition of a temperature of 23.5° C. and a humidity of 55%, it can be said that the dependence on the environment and that on the applied voltage are low, respectively.

When the value of the formula ($\log R_1 - \log R_2$) becomes larger than 1.0, the dependence on change in environment becomes high. On the other hand, when the value of the formula ($\log R_3 - \log R_4$) becomes larger than 1.0, the dependence on the change in applied voltage becomes high.

TABLE 2

| | Comparative Example 1 | Example 1 | Example 2 | Example 3 | Comparative Example 2 |
|---|---|---|---|---|---|
| $\log R_0$ | 9.3 | 9.3 | 9.3 | 9.3 | 9.3 |
| $\log R$ | — | 9.25 | 7.3 | 5.5 | 4.2 |
| $\log R - \log R_0$ | — | −0.05 | −2 | −3.8 | −5.1 |
| $\log R_1 - \log R_2$ | 1.7 | 0.2 | 0.1 | 0.1 | 0.1 |
| $\log R_3 - \log R_4$ | 0 | 0.3 | 0.5 | 0.8 | 1.1 |
| $(\log R_1 - \log R_2) + (\log R_3 - \log R_4)$ | 1.7 | 0.5 | 0.6 | 0.9 | 1.2 |
| Roller hardness (Asker C) | 27 | 32 | 35 | 39 | 43 |

Further, a lot of copies were printed using the electric conductive roller obtained in the above Examples as a transfer roller of an electophotographic copying machine. As a result, turbulence of image, partial omission phenomenon of letters and pinhole were not observed in the resulting image, and the roller caused no fatigue.

Examples 4 to 6 and Comparative Examples 3 to 5

(Base rubber: NBR)

According to the same manner as that described in Examples 1 to 3 except that NBR having a volume specific resistance of $10^{10.9}$ Ωcm, a glass transition point of −25° C., a Sp value of 9.6, a dielectric constant of 21 and a dielectric dissipation factor (tan δ) of $2\times10^0$ was used as the rubber material and it was mixed with electric conductive fillers and other additives in the amount shown in Table 3, an electric conductive roller was obtained.

Almost all of the components shown in Table 3 were represented by the trade name. Among them, components other than those used in Examples 1 to 7 are as follows.

Nipol DN219: NBR manufactured by Nihon Zeon Co., Ltd.

Pyrokisuma 3320K: magnesium oxide manufactured by Kyowa Kagaku Kogyo Co. Ltd.

TOT-N: tetrakis(2-ethylhexyl)thuiram disulfide (vulcanization accelerator) manufactured by Ohuchi Shinko Kagaku Kogyo Co., Ltd.

Nocceler M: 2-mercaptobenzothiazole (vulcanization accelerator) manufactured by Ohuchi Shinko Kagaku Kogyo Co., Ltd.

Nocceler CZ: N-cyclohexyl-2-benzothiazole sulfonamide (vulcanization accelerator) manufactured by Ohuchi Shinko Kagaku Kogyo Co., Ltd.

The electric characteristics and hardness of the resulting electric conductive roller are shown in Table 4. In the Table 4, R, $R_0$ and $R_1$ to $R_4$ are as defined above.

TABLE 3

| | Comparative Example 3 | Comparative Example 4 | Example 4 | Example 5 | Example 6 | Comparative Example 5 |
|---|---|---|---|---|---|---|
| Nipol DN219 | 100 | 100 | 100 | 100 | 100 | 100 |
| Diablack LH | — | 20 | 30 | 35 | 40 | 50 |
| Asahi #35G | — | 10 | 10 | 10 | 10 | 10 |
| Pyrokisuma 3220K | 10 | 10 | 10 | 10 | 10 | 10 |
| ZnO #1 | 5 | 5 | 5 | 5 | 5 | 5 |
| Stearic acid | 1 | 1 | 1 | 1 | 1 | 1 |
| PEG #4000 | 1 | 1 | 1 | 1 | 1 | 1 |
| Sulfur | 1.5 | 1.5 | 1.5 | 1.5 | 1.5 | 1.5 |
| TOT-N | 1.8 | 1.8 | 1.8 | 1.8 | 1.8 | 1.8 |
| Nocceler M | 1 | 1 | 1 | 1 | 1 | 1 |
| Nocceler CZ | 1.2 | 1.2 | 1.2 | 1.2 | 1.2 | 1.2 |
| Vinyfor AC#3 | 7 | 7 | 7 | 7 | 7 | 7 |
| Cellpaste 101 | 7 | 7 | 7 | 7 | 7 | 7 |
| Neocellborn N#5000 | 3 | 3 | 3 | 3 | 3 | 3 |

TABLE 4

| | Comparative Example 3 | Comparative Example 4 | Example 4 | Example 5 | Example 6 | Comparative Example 5 |
|---|---|---|---|---|---|---|
| $\log R_0$ | 8.5 | 8.5 | 8.5 | 8.5 | 8.5 | 8.5 |
| $\log R$ | — | 8.5 | 8.4 | 7.5 | 4.6 | 2.4 |
| $\log R - \log R_0$ | — | 0 | −0.1 | −1.0 | −3.9 | −6.1 |
| $\log R_1 - \log R_2$ | 1.8 | 1.2 | 0.4 | 0.1 | 0.1 | 0.1 |
| $\log R_3 - \log R_4$ | 0 | 0 | 0.4 | 0.4 | 0.8 | 1.1 |
| $(\log R_1 - \log R_2) + (\log R_3 - \log R_4)$ | 1.8 | 1.2 | 0.8 | 0.5 | 0.9 | 1.2 |
| Roller hardness (Asker C) | 19 | 23 | 27 | 33 | 38 | 45 |

Examples 7 to 8 and Comparative Examples 6 to 8

(Base rubber: copolymer of ethylene oxide and epichlorohydrin (hereinafter referred to as "ECO"))

According to the same manner as that described in Examples 1 to 3 except that ECO having a volume specific resistance of $10^{9.1}$ Ωcm, a glass transition point of −30° C., a Sp value of 9.1, a dielectric constant of 35 and a dielectric dissipation factor (tan δ) of $5\times10^{0}$ was used as the rubber material and it was mixed with electric conductive fillers and other additives in the amount shown in Table 5, an electric conductive roller was obtained.

Almost all of the components shown in Table 5 were represented by the trade name. Among them, components other than those used in Examples 1 to 6 are as follows.

Epichlomer CG102: ECO manufactured by Daiso Co., Ltd.

Splendor R300: processing aid manufactured by Kyodo Yakuhin Co., Ltd.

DHT 4A2: basic magnesium aluminum hydroxycarbonate hydrate (acid acceptance agent) manufactured by Kyowa Kagaku Kogyo Co., Ltd.

Whiten BF300: calcium carbonate manufactured by Shiraishi Calcium Co., Ltd.

ZINSNET-F: 2,4,6-trimercapto-s-triazine (vulcanizing agent) manufactured by Nihon Zeon Co., Ltd.

Santoguard PVI: N-(cyclohexylthio)phthalimide (scorch retardant) manufactured by Monsanto Co., Ltd.

The electric characteristics and hardness of the resulting electric conductive roller are shown in Table 6.

Examples 9 to 11 and Comparative Examples 9 to 11

(Base rubber: mixture of NBR and EPDM)

According to the same manner as that described in Examples 1 to 3 except that a mixture of NBR and EPDM, which has a volume specific resistance of $10^{11.5}$ Ωcm, a glass transition point of −25° C., a dielectric constant of 16 and a dielectric dissipation factor (tan δ) of $7\times10^{-1}$, was used as the rubber material and it was mixed with electric conductive fillers and other additives in the amount shown in Table 7, an electric conductive roller was obtained.

Almost all of the components shown in Table 7 were represented by the trade name. Among them, "Nipol DN207" is NBR manufactured by Nihon Zeon Co., Ltd. and "EP51" is EPDM manufactured by Nihon Gosei Gomu Co., Ltd. Further, "PEG #4000" means a polyethylene glycol having a molecular weight of 4000. Others are the same as those used in the above Examples.

The electric characteristics and hardness of the resulting electric conductive roller are shown in Table 8.

TABLE 5

| | Comparative Example 6 | Comparative Example 7 | Example 7 | Example 8 | Comparative Example 8 |
|---|---|---|---|---|---|
| Epichlomer CG102 | 100 | 100 | 100 | 100 | 100 |
| Diablack LH | — | 30 | 35 | 45 | 60 |
| Asahi #35G | — | 10 | 10 | 10 | 10 |
| Pyrokisuma 3220K | 10 | 10 | 10 | 10 | 10 |
| Splendor R300 | 3 | 3 | 3 | 3 | 3 |
| DHT 4A2 | 3 | 3 | 3 | 3 | 3 |
| Kyomag #150 | 1.5 | 1.5 | 1.5 | 1.5 | 1.5 |
| Whiten BF300 | 5 | 5 | 5 | 5 | 5 |
| ZISNET-F | 1 | 1 | 1 | 1 | 1 |
| Santoguard PV1 | 1 | 1 | 1 | 1 | 1 |
| Vinyfor AC#3 | 1 | 1 | 1 | 1 | 1 |
| Cellpaste 101 | 1 | 1 | 1 | 1 | 1 |
| Neocellborn N#5000 | 3 | 3 | 3 | 3 | 3 |

TABLE 6

| | Comparative Example 6 | Comparative Example 7 | Example 7 | Example 8 | Comparative Example 8 |
|---|---|---|---|---|---|
| $R_0$ | 6.1 | 6.1 | 6.1 | 6.1 | 6.1 |
| log R | — | 6.1 | 6.0 | 2.1 | 1.5 |
| $\log R - \log R_0$ | — | 0 | −0.1 | −4.0 | −4.6 |
| $\log R_1 - \log R_2$ | 2.4 | 1.1 | 0.1 | 0.1 | 0.1 |
| $\log R_3 - \log R_4$ | 0 | 0 | 0.1 | 0.5 | 1.1 |
| $(\log R_1 - \log R_2) + (\log R_3 - \log R_4)$ | 2.4 | 1.1 | 0.2 | 0.6 | 1.2 |
| Roller hardness | 32 | 35 | 37 | 47 | 53 |

(Asker C)

TABLE 7

| | Comparative Example 9 | Comparative Example 10 | Example 9 | Example 10 | Example 11 | Comparative Example 11 |
|---|---|---|---|---|---|---|
| Nipol DN207 | 70 | 70 | 70 | 70 | 70 | 70 |
| EP51 | 30 | 30 | 30 | 30 | 30 | 30 |
| Diablack LH | — | 30 | 35 | 40 | 50 | 60 |
| Asahi #35G | — | 10 | 10 | 10 | 10 | 10 |
| Hard clay | 20 | 20 | 20 | 20 | 20 | 20 |
| Pyrokisuma 3220K | 5 | 5 | 5 | 5 | 5 | 5 |
| ZnO #1 | 5 | 5 | 5 | 5 | 5 | 5 |
| Stearic acid | 1 | 1 | 1 | 1 | 1 | 1 |
| PEG #40000 | 1 | 1 | 1 | 1 | 1 | 1 |
| Sulfur | 2 | 2 | 2 | 2 | 2 | 2 |
| Nocceler TT | 0.8 | 0.8 | 0.8 | 0.8 | 0.8 | 0.8 |
| Nocceler M | 1.3 | 1.3 | 1.3 | 1.3 | 1.3 | 1.3 |
| Nocceler CZ | 1.6 | 1.6 | 1.6 | 1.6 | 1.6 | 1.6 |
| Cellpaste 101 | 10 | 10 | 10 | 10 | 10 | 10 |
| Neocellborn N#5000 | 10 | 10 | 10 | 10 | 10 | 10 |

TABLE 8

| | Comparative Example 9 | Comparative Example 10 | Example 9 | Example 10 | Example 11 | Comparative Example 11 |
|---|---|---|---|---|---|---|
| log $R_0$ | 8.7 | 8.7 | 8.7 | 8.7 | 8.7 | 8.7 |
| log R | — | 8.7 | 8.5 | 7.9 | 6.0 | 5.3 |
| log R − log $R_0$ | — | 0 | −0.2 | −1.8 | −3.7 | −4.4 |
| log $R_1$ − log $R_2$ | 1.8 | 1.1 | 0.1 | 0.1 | 0.1 | 0.1 |
| log $R_3$ − log $R_4$ | 0 | 0.1 | 0.1 | 0.3 | 0.7 | 1.1 |
| (log $R_1$ − log $R_2$) + (log $R_3$ − log $R_4$) | 1.8 | 1.2 | 0.2 | 0.4 | 0.8 | 1.2 |
| Roller hardness (Asker C) | 22 | 31 | 35 | 37 | 44 | 52 |

Examples 12 to 13 and Comparative Examples 12 to 13

(Base rubber: mixture of NBR and EPDM)

According to the same manner as that described in Examples 1 to 3 except that a mixture of NBR and EPDM, which has a volume specific resistance of $10^{11.5}$ Ωcm, a glass transition point of −25° C., a dielectric constant of 16 and a dielectric dissipation factor (tan δ) of $7\times10^{-1}$, was used as the rubber material and it was mixed with electric conductive fillers and other additives in the amount shown in Table 9, an electric conductive roller was obtained.

Almost all of the components shown in Table 9 were represented by the trade name. Among them, "Taipake ET-500W" is electric conductive filler which is titanium oxide coated with tin oxide manufactured by Ishihara Sangyo Co., Ltd. Others are the same as those used in the above Examples.

TABLE 9

| | Comparative Example 12 | Example 12 | Example 13 | Comparative Example 13 |
|---|---|---|---|---|
| Nipol DN207 | 70 | 70 | 70 | 70 |
| EP51 | 30 | 30 | 30 | 30 |
| Taipake ET-500W | 100 | .150 | 200 | 250 |
| Hard clay | 20 | 20 | 20 | 20 |
| Pyrokisuma 3320K | 5 | 5 | 5 | 5 |
| ZnO #1 | 5 | 5 | 5 | 5 |
| Stearic acid | 1 | 1 | 1 | 1 |
| PEG #4000 | 1 | 1 | 1 | 1 |
| Sulfur | 2 | 2 | 2 | 2 |
| Nocceler TT | 0.8 | 0.8 | 0.8 | 0.8 |
| Nocceler M | 1.3 | 1.3 | 1.3 | 1.3 |
| Nocceler CZ | 1.6 | 1.6 | 1.6 | 1.6 |
| Cellpaste 101 | 10 | 10 | 10 | 10 |
| Neocellborn N#5000 | 10 | 10 | 10 | 10 |

The electric characteristics and hardness of the resulting electric conductive roller are shown in Table 10.

TABLE 10

| | Comparative Example 12 | Example 12 | Example 13 | Comparative Example 13 |
|---|---|---|---|---|
| log $R_0$ | 8.7 | 8.7 | 8.7 | 8.7 |
| log R | 8.7 | 7.0 | 4.9 | 4.1 |
| log R − log $R_0$ | 0 | −1.7 | −3.8 | −4.6 |
| log $R_1$ − log $R_2$ | 1.2 | 0.3 | 0.4 | 0.5 |
| log $R_3$ − log $R_4$ | 0.1 | 0.1 | 0.4 | 1.1 |
| (log $R_1$ − log $R_2$) + (log $R_3$ − log $R_4$) | 1.3 | 0.3 | 0.8 | 1.6 |
| Roller hardness (Asker C) | 26 | 31 | 38 | 43 |

Example 14 and Comparative Examples 14 to 16

(Base rubber: HNBR)

According to the same manner as that described in Examples 1 to 3 except that HNBR having a volume specific resistance of $10^{10.6}$ Ωcm, a glass transition point of −25° C., a Sp value of 10.0, a dielectric constant of 25 and a dielectric dissipation factor (tan δ) of $4\times10^{0}$ was used as the rubber material and it was mixed with electric conductive fillers and other additives in the amount shown in Table 11, an electric conductive roller was obtained.

Almost all of the components shown in Table 11 were represented by the trade name. Among them, "Zetpol 2010L" is HNBR manufactured by Nihon Zeon Co., Ltd. Others are the same as those used in the above Examples.

TABLE 11

| | Comparative Example 14 | Comparative Example 15 | Example 15 | Comparative Example 16 |
|---|---|---|---|---|
| Zetpol 2010L | 100 | 100 | 100 | 100 |
| Diablack LH | — | 35 | 40 | 50 |
| Hard clay | 10 | 10 | 10 | 10 |
| Pyrokisuma 3320K | 10 | 10 | 10 | 10 |
| ZnO #1 | 5 | 5 | 5 | 5 |
| Stearic acid | 1 | 1 | 1 | 1 |
| PEG #4000 | 1 | 1 | 1 | 1 |
| Sulfur | 0.5 | 0.5 | 0.5 | 0.5 |
| TOT-N | 2 | 2 | 2 | 2 |
| Nocceler M | 0.5 | 0.5 | 0.5 | 0.5 |
| Vinyfor AC#3 | 1 | 1 | 1 | 1 |
| Cellpaste 101 | 1 | 1 | 1 | 1 |
| Neocellborn N#5000 | 12 | 12 | 12 | 12 |

The electric characteristics and hardness of the resulting electric conductive roller are shown in Table 12.

TABLE 12

| | Comparative Example 14 | Comparative Example 15 | Example 15 | Comparative Example 16 |
|---|---|---|---|---|
| $\log R_0$ | 8.1 | 8.1 | 8.1 | 8.1 |
| $\log R$ | — | 8.1 | 7.6 | 4.0 |
| $\log R - \log R_0$ | — | 0 | −0.5 | −4.1 |
| $\log R_1 - \log R_2$ | 1.7 | 1.1 | 0.2 | 0.2 |
| $\log R_3 - \log R_4$ | 0 | 0.1 | 0.2 | 1.5 |
| $(\log R_1 - \log R_2) + (\log R_3 - \log R_4)$ | 1.7 | 1.2 | 0.4 | 1.7 |
| Roller hardness (Asker C) | 34 | 36 | 38 | 42 |

As is apparent from these Examples and Comparative Examples, the electric conductive roller wherein log R and log $R_0$ are the same has a high dependence on the change in environment because the value of ($\log R_1 - \log R_2$) is larger than 1.0. On the other hand, it is apparent that the electric conductive roller wherein the value of ($\log R - \log R_0$) is smaller than −4 has a high dependence on the applied voltage because the value of ($\log R_3 - \log R_4$) is larger than 1.0.

Comparative Examples 17 to 19

(Base rubber: EPDM)

According to the same manner as that described in Examples 1 to 3 except that EPDM having a volume specific resistance of $10^{15.7}$ Ωcm, a glass transition point of −50° C., a Sp value of 7.9, a dielectric constant of 2.2 and a dielectric dissipation factor (tan δ) of $1\times10^{-3}$ was used as the rubber material and it was mixed with electric conductive fillers and other additives in the amount shown in Table 13, an electric conductive roller was obtained.

Almost all of the components shown in Table 13 were represented by the trade name. Among them, "EPT4010" is EPDM manufactured by Mitsui Petroleum Chemical Industries Co., Ltd. Others are the same as those used in the above Examples.

TABLE 13

| | Comparative Example 17 | Comparatlve Example 18 | Comparative Example 19 |
|---|---|---|---|
| EPT 4010 | 100 | 100 | 100 |
| Diablack LH | — | 22 | 25 |
| Asahi #35G | — | 10 | 10 |
| Pyrokisuma 3320K | 30 | 30 | 30 |
| ZnO #1 | 5 | 5 | 5 |
| Stearic acid | 2 | 2 | 2 |
| PEG #4000 | 1 | 1 | 1 |
| Sulfur | 2 | 2 | 2 |
| Nocceler TT | 0.7 | 0.7 | 0.7 |
| Nocceler BZ | 2 | 2 | 2 |
| Nocceler M | 2 | 2 | 2 |
| Nocceler TTTE | 0.5 | 0.5 | 0.5 |
| Vinyfor AC#3 | 4 | 4 | 4 |
| Cellpaste 101 | 4 | 4 | 4 |
| Neocellborn N#5000 | 12 | 12 | 12 |

The electric characteristics and hardness of the resulting electric conductive roller are shown in Table 14.

TABLE 14

| | Comparative Example 17 | Comparatlve Example 18 | Comparative Example 19 |
|---|---|---|---|
| $\log R_0$ | 12.0 | 12.0 | 12.0 |
| $\log R$ | — | 9.2 | 7.6 |
| $\log R - \log R_0$ | — | −2.8 | −4.4 |
| $\log R_1 - \log R_2$ | 0 | 0.1 | 0.1 |
| $\log R_3 - \log R_4$ | 0 | 2.1 | 1.8 |
| $(\log R_1 - \log R_2) + (\log R_3 - \log R_4)$ | 0 | 2.2 | 1.9 |
| Roller hardness (Asker C) | 18 | 37 | 39 |

Comparative Examples 20 to 23

(Base rubber: chlorosulfonated polyethylene (hereinafter referred to as "CSM"))

According to the same manner as that described in Examples 1 to 3 except that CSM having a volume specific resistance of $10^{12.6}$ Ωcm, a glass transition point of −35° C., a Sp value of 8.9, a dielectric constant of 4 and a dielectric dissipation factor (tan δ) of $5\times10^{-2}$ was used as the rubber material and it was mixed with electric conductive fillers and other additives in the amount shown in Table 15, an electric conductive roller was obtained.

Almost all of the components shown in Table 15 were represented by the trade name. Among them, "Denka CSM350" is CSM manufactured by Denki Kagaku Kogyo Co., Ltd. and "Nocceler TRA" is dipentamethylenethiuram tetrasulfide (vulcanization accelerator) manufactured by Ohuchi Shinko Kagaku Kogyo Co., Ltd. Others are the same as those used in the above Examples.

TABLE 15

| | Comparative Example 20 | Comparative Example 21 | Comparative Example 22 | Comparative Example 23 |
|---|---|---|---|---|
| Denka CSM350 | 100 | 100 | 100 | 100 |
| Diablack LH | — | 25 | 30 | 35 |
| Asahi #35G | — | 10 | 10 | 10 |
| Pyrokisuma 3320K | 10 | 10 | 10 | 10 |
| ZnO #1 | 20 | 20 | 20 | 20 |
| Stearic acid | 1 | 1 | 1 | 1 |
| Nocceler TRA | 2 | 2 | 2 | 2 |
| Vinyfor AC#3 | 1 | 1 | 1 | 1 |

TABLE 15-continued

| | Comparative Example 20 | Comparative Example 21 | Comparative Example 22 | Comparative Example 23 |
|---|---|---|---|---|
| Cellpaste 101 | 1 | 1 | 1 | 1 |
| Neocellborn N#5000 | 12 | 12 | 12 | 12 |

The electric characteristics and hardness of the resulting electric conductive roller are shown in Table 16.

TABLE 16

| | Comparative Example 20 | Comparative Example 21 | Comparative Example 22 | Comparative Example 23 |
|---|---|---|---|---|
| log $R_0$ | 10.5 | 10.5 | 10.5 | 10.5 |
| log R | — | 10.5 | 7.8 | 6.6 |
| log R − log $R_0$ | — | 0 | −2.7 | −3.9 |
| log $R_1$ − log $R_2$ | 1.7 | 0.1 | 0.1 | 0.1 |
| log $R_3$ − log $R_4$ | 0 | 1.5 | 1.4 | 1.4 |
| (log $R_1$ − log $R_2$) + (log $R_3$ − log $R_4$) | 1.7 | 1.6 | 1.5 | 1.5 |
| Roller hardness (Asker C) | 31 | 35 | 38 | 40 |

As apparent from these Comparative Examples 18 to 19 and 21 to 23, when using a rubber having a volume specific resistance of more than $10^{12}$ Ωcm, the resulting electric conductive roller has a high dependence on the applied voltage because the value of (log $R_3$−log $R_4$) is larger than 1.0 even if an electric conductive filler is added.

Further, as apparent from Comparative Example 17, when no electric conductive filler is added in a rubber having a volume specific resistance of much larger than $10^{12}$ Ωcm, the resulting electric conductive roller is not within a practical range because the resistance value $R_0$ is too large.

Further, as apparent from Comparative Example 20, when no electric conductive filler is added in a rubber having a volume specific resistance of slightly larger than $10^{12}$ Ωcm, the resistance value becomes slightly smaller than that of Comparative Example 17 and the resulting electric conductive roller comes near to the practical range, but it has a high dependence on the change in environment because the value of (log $R_1$−log $R_2$) is large.

What is claimed is:

1. An electrically conductive roller comprising an inner electrically conductive shaft in direct electrical contact with an outer conductive tube;

said tube comprising rubber having a specific volume resistance, wherein the specific volume resistance of said rubber prior to incorporation of an electric conductive filler is $10^9$ to $10^{12}$ Ω-cm and at least one electric conductive filler, selected from the group consisting of carbon black, graphite and metal oxides, mixed in the rubber;

said outer conductive tube, comprising said rubber and said conductive filler, having an electrical resistance, when measured between said inner conductive shaft and an outer circumferential surface of said conductive tube, satisfying the following formulas (1) to (4):

$$\log R \geqq \log R_0 - 4 \quad (1)$$

$$\log R < \log R_0 \quad (2)$$

wherein R is a resistance in ohms of the roller when the electric conductive filler is added to said rubber, and $R_0$ is a resistance in ohms of the roller when no electric conductive filler is added to said rubber;

$$\log R_1 - \log R_2 \leqq 1.0 \quad (3)$$

$$\log R_3 - \log R_4 \leqq 1.0 \quad (4)$$

wherein $R_1$ is a resistance in ohms of the roller when an applied voltage is 1,000 V under the condition of a temperature of 10° C. and a humidity of 15%; $R_2$ is a resistance in ohms of the roller when an applied voltage is 1,000 V under the condition of a temperature of 32.5° C. and a humidity of 90%; $R_3$ is a resistance in ohms of the roller when an applied voltage is 10 V under the condition of a temperature of 23.5° C. and a humidity of 55%; $R_4$ is a resistance in ohms of the roller when an applied voltage is 1,000 V under the condition of a temperature of 23.5° C. and a humidity of 55%.

2. The electrically conductive roller according to claim 1, wherein the rubber is selected from the group consisting of epichlorohydrin rubber, acrylonitrile-butadiene copolymer rubber, hydrogenated nitrile rubber, chloroprene, mixture of acrylonitrile-butadiene copolymer rubber and ethylene-propylene-diene copolymer rubber, mixture of hydrogenated nitrile rubber and ethylene-propylene-diene copolymer rubber, mixture of hydrogenated nitrile rubber and acrylonitrile-butadiene copolymer rubber, and mixture of hydrogenated nitrile rubber, acrylonitrile-butadiene copolymer rubber and ethylene-propylene-diene copolymer rubber.

3. The electrically conductive roller according to claim 1, wherein said outer tube comprises a foamed material which has a volume which is 40 to 300% greater than what the volume of said tube would have been had it been made of the same quantity of the same materials, but had not been in foam form.

4. The electrically conductive roller according to claim 1, wherein said outer tube comprises a foam tube disposed about, and in electrical contact with, said electrically conductive inner shaft.

5. The electrically conductive roller according to claim 4, wherein said foam tube, comprising said rubber and said conductive filler, has an electric resistance measured from said electrically conductive inner shaft to said circumferential outer surface of the tube, of $10^3$ to $10^{10}$ Ω.

* * * * *